US009445325B2

(12) United States Patent
Zhi et al.

(10) Patent No.: US 9,445,325 B2
(45) Date of Patent: Sep. 13, 2016

(54) METHOD, DEVICE AND SYSTEM FOR REPORTING SIGNAL QUALITY MEASUREMENT RESULT

(71) Applicant: Huawei Technologies Co., Ltd., Shenzhen, Guangdong (CN)

(72) Inventors: Yuliang Zhi, Tianjin (CN); Yanyan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/538,558

(22) Filed: Nov. 11, 2014

(65) Prior Publication Data

US 2015/0065140 A1  Mar. 5, 2015

Related U.S. Application Data

(63) Continuation of application No. PCT/CN2012/075408, filed on May 11, 2012.

(51) Int. Cl.
*H04W 28/02* (2009.01)
*H04W 28/08* (2009.01)
(Continued)

(52) U.S. Cl.
CPC ......... *H04W 36/0083* (2013.01); *H04W 36/08* (2013.01)

(58) Field of Classification Search
CPC ............... H04W 28/0226; H04W 28/0231; H04W 28/0236; H04W 28/0268; H04W 28/0273; H04W 28/0284; H04W 28/08; H04W 28/16; H04W 28/18; H04W 28/20; H04W 28/22; H04W 28/24; H04W 36/00; H04W 36/0011; H04W 36/0016; H04W 36/0022; H04W 36/0027; H04W 36/0055; H04W 36/0061; H04W 36/0083; H04W 36/0088; H04W 36/0094; H04W 36/30; H04W 36/34; H04W 40/12; H04W 40/16
USPC ........ 455/436, 437, 438, 439, 442, 443, 444
See application file for complete search history.

(56) References Cited

U.S. PATENT DOCUMENTS

| 2004/0247066 A1* | 12/2004 | Suda | ................. H03L 7/0814 |
| | | | 375/376 |
| 2007/0197251 A1* | 8/2007 | Das | ................. H04W 52/146 |
| | | | 455/522 |

(Continued)

FOREIGN PATENT DOCUMENTS

| CN | 102170671 A | 8/2011 |
| CN | 102238516 A | 11/2011 |

(Continued)

OTHER PUBLICATIONS

"3rd Generation Partnership Project; Technical Specification Group Radio Access Network; Radio Resource Control (RRC); Protocol specification (Release 11)", 3GPP TS 25.331 V11.1.0, Mar. 2012, 1911 pages.

(Continued)

*Primary Examiner* — Christopher M Brandt
*Assistant Examiner* — Ki Ha Nam

(57) ABSTRACT

The present application discloses a method, a device, and a system for reporting a signal quality measurement result, relates to the field of communications, and implements reporting of an adjacent-frequency signal quality measurement result by a terminal. Embodiments of the present application disclose a method for reporting a signal quality measurement result, including: receiving adjacent frequency information, an adjacent-frequency signal quality reporting amount, and a reporting threshold corresponding to the adjacent-frequency signal quality reporting amount from a radio network node; according to the adjacent frequency information, performing measurement to obtain an adjacent-frequency signal quality measurement result; and reporting the adjacent-frequency signal quality measurement result in a preset bit string format to the radio network node. The embodiments of the present application are mainly used for redirection, handover, and cell change operations of a terminal.

8 Claims, 3 Drawing Sheets

(51) Int. Cl.
   *H04W 28/16* (2009.01)
   *H04W 36/34* (2009.01)
   *H04W 36/00* (2009.01)
   *H04W 36/08* (2009.01)

(56) References Cited

U.S. PATENT DOCUMENTS

2008/0146231 A1    6/2008  Huang et al.
2010/0027507 A1*   2/2010  Li ..................... H04W 36/0055
                                                        370/331
2010/0173660 A1*   7/2010  Liu ...................... H04W 24/02
                                                        455/501

FOREIGN PATENT DOCUMENTS

CN         102404810 A      4/2012
EP         2 381 714 A1    10/2011
WO     WO 2007/073121 A1    6/2007

OTHER PUBLICATIONS

"Network Controlled CELL_FACH mobility", Nokia Siemens Networks, 3GPP TSG-RAN WG2 Meeting #77bis, Mar. 26-30, 2012, 4 pages.
"Enhanced Network Control of Mobility in CELL_FACH", Renesas Mobile Europe Ltd., 3GPP TSG-RAN WG2 Meeting #77bis, Mar. 26-30, 2012, 4 pages.
"Discussion on CELL_FACH mobility enhancement to LTE", Huawei, HiSilicon, 3GPP TSG RAN WG2 #77bis, Mar. 26-30, 2012, 3 pages.
"Discussion on CELL_FACH mobility enhancement to LTE", Huawei, HiSilicon, 3GPP TSG RAN WG2 #78, May 21-25, 2012, 5 pages.

* cited by examiner

METHOD, DEVICE AND SYSTEM FOR REPORTING SIGNAL QUALITY MEASUREMENT RESULT

CROSS-REFERENCE TO RELATED APPLICATIONS

This application is a continuation of International Application No. PCT/CN2012/075408, filed on May 11, 2012, which is hereby incorporated by reference in their entireties.

TECHNICAL FIELD

The present application relates to the field of communications, and in particular, to a method, a device, and a system for reporting a signal quality measurement result.

BACKGROUND

In a wireless mobile communications system, due to movement of a terminal and a change in channel quality, the terminal may autonomously select a cell with better quality; and alternatively, a radio network node on a network side may change the terminal to the cell with better quality.

In a system broadcast message defined by an existing UMTS (universal mobile telecommunications system, universal mobile telecommunications system) standard, how to report a measurement result in an LTE (long term evolution, long term evolution) system is not specified. In this situation, when the network side needs to perform cell redirection on the terminal, as the terminal cannot report an LTE cell signal quality measurement result that serves as reference data for a radio network controller, the terminal redirection success rate of the radio network controller is relatively low.

SUMMARY

A plurality of aspects of the present application provides a method, a device, and a system for reporting a signal quality measurement result, to implement the reporting of the signal quality measurement result by a terminal.

One aspect of the present application provides a method for reporting a signal quality measurement result, including: receiving adjacent frequency information, an adjacent-frequency signal quality reporting amount, and a reporting threshold corresponding to the adjacent-frequency signal quality reporting amount from a radio network node; performing measurement according to the adjacent-frequency information to obtain an adjacent-frequency signal quality measurement result; and reporting the adjacent-frequency signal quality measurement result in a preset bit string format to the radio network node according to the adjacent frequency information, the adjacent-frequency signal quality reporting amount, and the reporting threshold, so that the radio network node obtains the adjacent-frequency signal quality according to the adjacent-frequency signal quality measurement result.

Another aspect of the present application provides a method for reporting a signal quality measurement result, including: sending adjacent frequency information, an adjacent-frequency signal quality reporting amount, and a reporting threshold corresponding to the adjacent-frequency signal quality reporting amount to a terminal; and receiving an adjacent-frequency signal quality measurement result in a preset bit string format from the terminal, so that the radio network node obtains the adjacent-frequency signal quality according to the adjacent-frequency signal quality measurement result.

Another aspect of the present application provides a terminal, including: an information receiver, configured to receive adjacent frequency information, an adjacent-frequency signal quality reporting amount, and a reporting threshold corresponding to the adjacent-frequency signal quality reporting amount delivered by a radio network node; a measurement processor, configured to perform measurement according to the adjacent frequency information to obtain an adjacent-frequency signal quality measurement result; and a sender, configured to report the adjacent-frequency signal quality measurement result in a preset bit string format to the radio network node according to the adjacent frequency information, the adjacent-frequency signal quality reporting amount, and the reporting threshold, so that the radio network node obtains the adjacent-frequency signal quality according to the adjacent-frequency signal quality measurement result.

Another aspect of the present application provides a radio network node, including: a sender, configured to send adjacent frequency information, an adjacent-frequency signal quality reporting amount, and a reporting threshold corresponding to the adjacent-frequency signal quality reporting amount to a terminal; and a receiver, configured to receive an adjacent-frequency signal quality measurement result reported in a preset bit string format by the terminal, so that the radio network node obtains the adjacent-frequency signal quality according to the adjacent-frequency signal quality measurement result.

A system for reporting a signal quality measurement result includes a terminal and/or a radio network node.

Embodiments of the present application provide a method, a device, and a system for reporting a signal quality measurement result to implement reporting of an adjacent-frequency signal quality measurement result by a terminal, so that the radio network node is capable of making, according to the adjacent-frequency signal quality measurement result, a decision for the terminal to change to a cell, thereby increasing the success rate of cell handover, redirection, and cell change.

BRIEF DESCRIPTION OF THE DRAWINGS

To illustrate the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION

Figure 1:
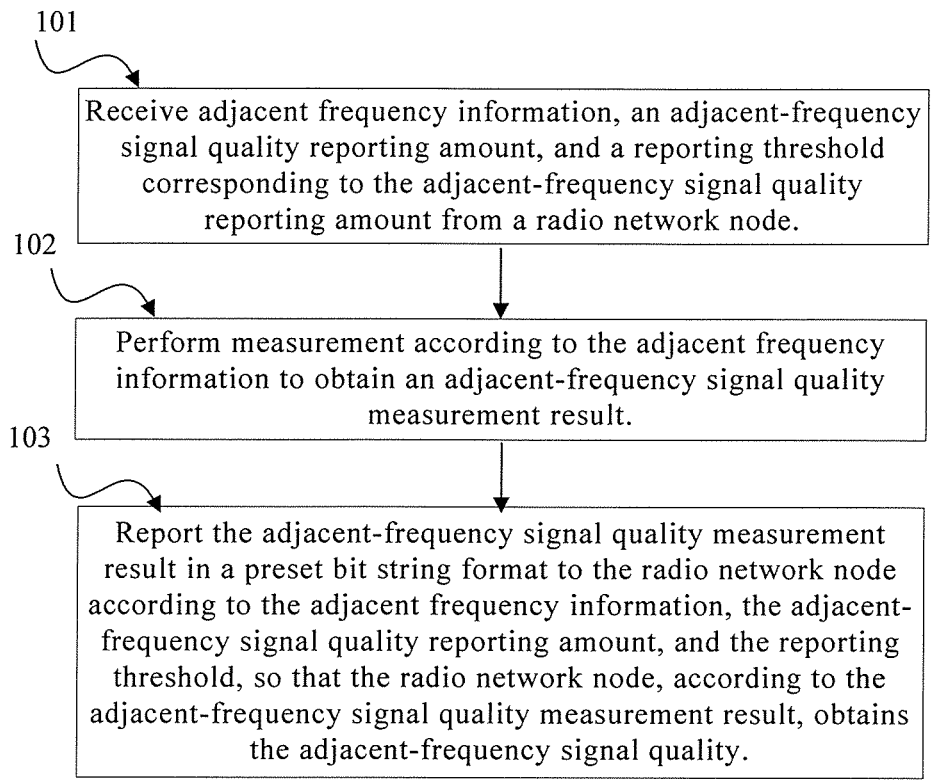
FIG. 1 is a flowchart of a method for reporting a signal quality measurement result according to an embodiment of the present application.

In the following description, to illustrate rather than limit, specific details such as particular system structure, interface, and technology are provided to make a better understanding of the present application. However, it should be understood by a person skilled in the art that the present application may also be implemented in other embodiments without the specific details. In other situations, detail descriptions of well known apparatus, circuit and method are omitted, so that the present application is described without being disturbed by the unnecessary details.

Communications technologies described in this specification are applicable to various communications systems, such as, current 2G and 3G communications systems, and a next-generation communications system, for example, a global system for mobile communications (GSM, Global System for Mobile communications), a code division multiple access (CDMA, Code Division Multiple Access) system, a time division multiple access (TDMA, Time Division Multiple Access) system, a wideband code division multiple access wireless (WCDMA, Wideband Code Division Multiple Access Wireless) system, a frequency division multiple addressing (FDMA, Frequency Division Multiple Addressing) system, an orthogonal frequency-division multiple access (OFDMA, Orthogonal Frequency-Division Multiple Access) system, a single-carrier FDMA (SC-FDMA) system, a general packet radio service (GPRS, General Packet Radio Service) system, a long term evolution (LTE, Long Term Evolution) system, and other communications system of this type.

This specification describes various aspects with reference to a user equipment and/or a base station and/or a base station controller.

The user equipment may be a wireless terminal or a wired terminal. The wireless terminal may be a device providing voice and/or data connectivity for users, a handheld device having a wireless connection function, or another processing device connected to a wireless modem. A wireless terminal may communicate with one or more core networks through a radio access network (such as RAN, Radio Access Network). The wireless terminal may be a mobile terminal, such as a mobile phone (or called a "cellular" phone) or a computer equipped with a mobile terminal. For example, the wireless terminal may be a portable, pocket-sized, handheld, computer-embedded, or vehicle-mounted mobile apparatus, which exchanges voice and/or data with the radio access network. For example, it may be a device such as a personal communication service (PCS, Personal Communication Service) phone, a cordless telephone set, a session initiation protocol (SIP) phone, a wireless local loop (WLL, Wireless Local Loop) station, a personal digital assistant (PDA, Personal Digital Assistant) and the like. The wireless terminal may also be called a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) may be a device in communication with a wireless terminal via one or more sectors over an air interface in an access network. The base station may be used to perform a mutual conversion between a received over-the-air frame and an IP packet and serve as a router between the wireless terminal and a rest portion of the access network, where the rest portion of the access network may include an internet protocol (IP) network. The base station may also coordinate attribute management of the air interface. For example, the base station may be a base station (BTS, Base Transceiver Station) in a GSM or a CDMA, may also be a base station (NodeB) in a WCDMA network, and may further be an evolved base station (NodeB or eNB or e-NodeB, evolutional Node B) in an LTE network, which is not limited in the present application.

The base station controller may be a base station controller (BSC, base station controller) in the GSM network or the CDMA network, or a radio network controller (RNC, Radio Network Controller) in the WCDMA network, which is not limited in the present application.

Further, the terms "system" and "network" in this specification may always be exchanged for use in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification usually represents that the former and later associated objects are in an "or" relationship.

An embodiment of the present application provides a method for reporting a signal quality measurement result, which involves a terminal side, as shown in FIG. 1.

101: Receive adjacent frequency information, an adjacent-frequency signal quality reporting amount, and a reporting threshold corresponding to the adjacent-frequency signal quality reporting amount from a radio network node.

The adjacent frequency information may refer to a specific frequency name that is notified from the radio network node to the terminal.

In a specific LTE system, the adjacent-frequency signal quality reporting amount includes an RSRP (reference receiving signal power, reference signal received power) or an RSRQ (reference receiving signal quality, reference signal received quality). If the adjacent-frequency signal quality reporting amount is RSRP, correspondingly, the reporting threshold is an RSRP reporting threshold; and if the adjacent-frequency signal quality reporting amount is RSRQ, the reporting threshold is an RSRQ reporting threshold.

102: Perform measurement according to the adjacent frequency information to obtain an adjacent-frequency signal quality measurement result.

Specifically, the terminal determines, according to a preset measurement rule, whether to measure the signal quality of an adjacent frequency, and determines to measure the signal quality on which adjacent frequency, so as to obtain the adjacent-frequency signal quality measurement result.

For example, the terminal may perform measurement according to a cell reselection measurement rule; when the signal quality of a serving cell is higher than a specific threshold, the terminal may start measuring an adjacent frequency whose priority is higher than a specific priority; and when the signal quality of the serving cell is lower than a specific threshold, the terminal may start measuring all adjacent frequencies. It should be noted that, the rule used in the example is a rule among the cell reselection measurement rules; with the evolution of network technologies, the cell reselection rule may change, and even a new type of measurement rule may come into being. However, regardless of which rule is used, the UE may measure an adjacent frequency and obtain adjacent-frequency signal quality.

103: Report the adjacent-frequency signal quality measurement result in a preset bit string format to the radio network node according to the adjacent frequency information, the adjacent-frequency signal quality reporting amount, and the reporting threshold, so that the radio network node obtains the adjacent-frequency signal quality according to the adjacent-frequency signal quality measurement result.

The radio network node obtains the adjacent-frequency signal quality measurement result reported by the terminal, so as to obtain the adjacent-frequency signal quality; based on this, the radio network node makes a decision for determining whether to perform redirection and cell change on the terminal that reports the adjacent-frequency signal quality measurement result.

Each adjacent frequency received from the radio network node corresponds to a bit in the preset bit string; when the bit value is a first value (for example, 1), it indicates that: there is a cell with the signal quality higher than the reporting threshold on the corresponding frequency; and when the bit value is a second value (for example, 0), it indicates that: there is no cell with the signal quality higher than the reporting threshold on the corresponding frequency or there is no corresponding frequency for the bit.

Each adjacent frequency received from the radio network node corresponds to a bit in the preset bit string, where the preset bit string includes N bits, and the number of adjacent frequencies received from the radio network node is k; both N and k are integers greater than 0 and N≥k; when the bit values of the 1st to k-th bits in the preset bit string are the first value (for example, 1) it indicates that there is a cell with the signal quality higher than the reporting threshold on the corresponding frequency for each of the 1st to k-th bits; and when the bit values of the 1st to k-th bits in the preset bit string are the second value (for example, 0), it indicates that there is no cell with the signal quality higher than the reporting threshold on the corresponding frequency for each of the 1st to k-th bits.

When the bit values of the (k+1)-th to N-th bits in the preset bit string are the second value (for example, 0), there is no corresponding frequency for these bits; and when the bit values of the (k+1)-th to N-th in the preset bit string are the first value (for example, 1), there is a corresponding frequency for these bits and there is a cell with the signal quality higher than the reporting threshold on the corresponding frequency.

Figure 2:
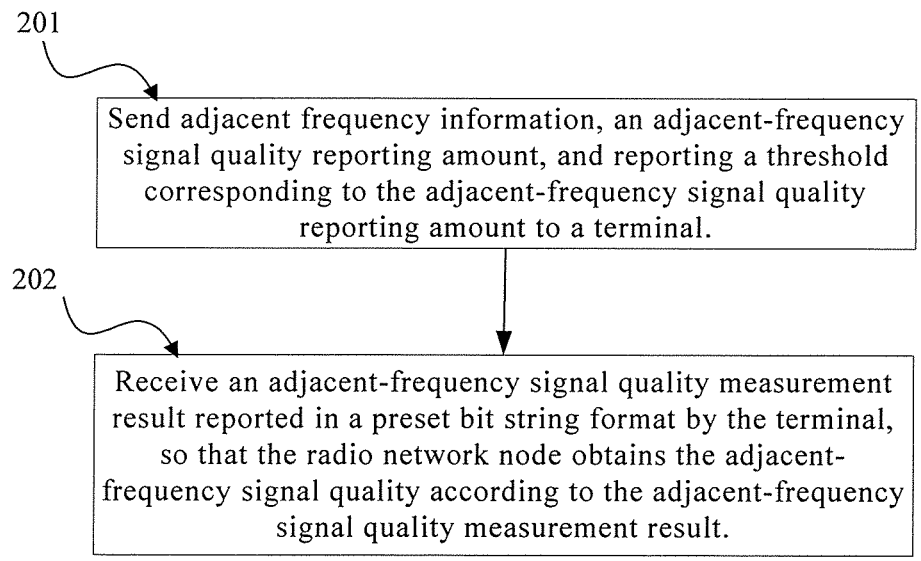
FIG. 2 is a flowchart of another method for reporting a signal quality measurement result according to another embodiment of the present application.

An embodiment of the present application further provides a method for reporting a signal quality measurement result, which involves a radio network node side, as shown in FIG. 2. This method includes the following steps:

201: Send adjacent frequency information, an adjacent-frequency signal quality reporting amount, and a reporting threshold corresponding to the adjacent-frequency signal quality reporting amount to a terminal.

If the adjacent-frequency signal quality reporting amount is RSRP, the corresponding reporting threshold is an RSRP reporting threshold; and if the adjacent-frequency signal quality reporting amount is RSRQ, the reporting threshold is an RSRQ reporting threshold.

202: Receive an adjacent-frequency signal quality measurement result reported in a preset bit string format by the terminal, so that the radio network node obtains the adjacent-frequency signal quality according to the adjacent-frequency signal quality measurement result.

The embodiment of the present application provides a method for reporting a signal quality measurement result, by receiving adjacent frequency information, an adjacent-frequency signal quality reporting amount, and a reporting threshold corresponding to the adjacent-frequency signal quality reporting amount from a radio network node, obtaining an adjacent-frequency signal quality measurement result, and reporting the adjacent-frequency signal quality measurement result in the preset bit string format to the radio network node, the reporting of the adjacent-frequency signal quality measurement result by a terminal is implemented, so that the radio network node is capable of making, according to the adjacent-frequency signal quality measurement result, a decision for the terminal to change to a cell, thereby increasing the success rate of cell handover, redirection, and cell change.

Figure 3:
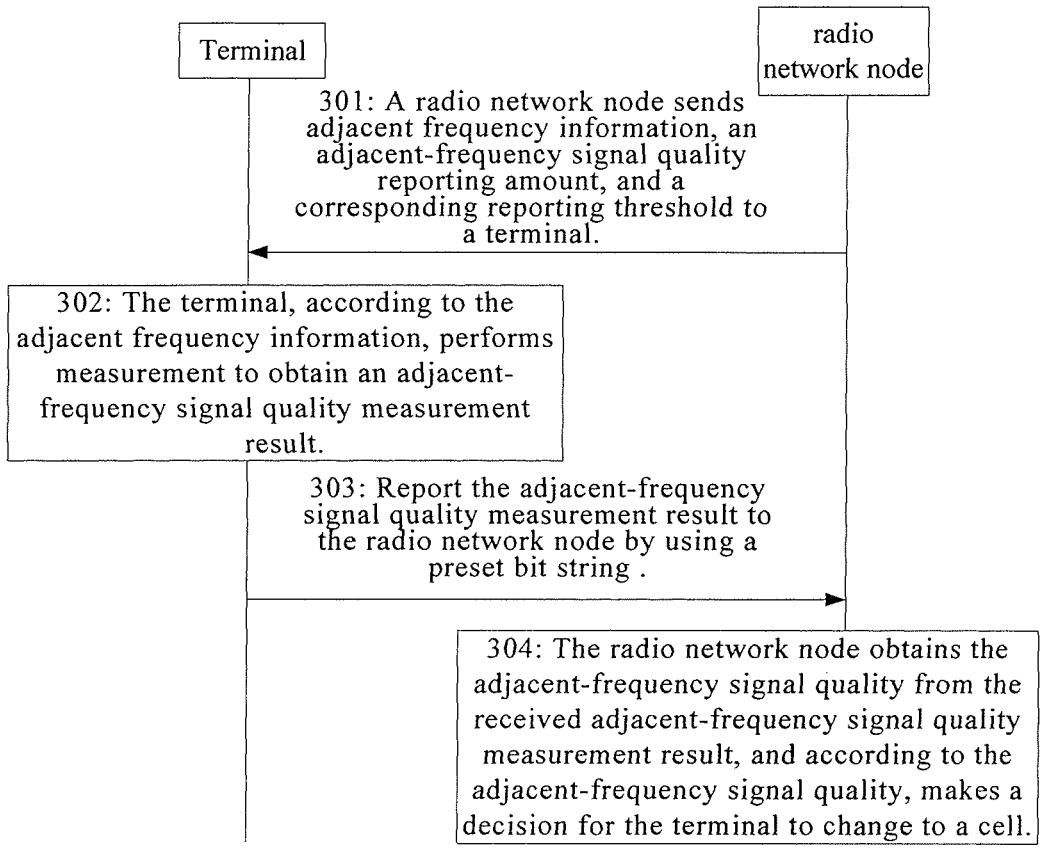
FIG. 3 is a flowchart of a method for reporting a signal quality measurement result according to another embodiment of the present application.

Another embodiment of the present application provides a method for reporting a signal quality measurement result, as shown in FIG. 3.

301: A radio network node sends adjacent frequency information, an adjacent-frequency signal quality reporting amount, and a corresponding reporting threshold to a terminal.

If the adjacent-frequency signal quality reporting amount is RSRP, the corresponding reporting threshold is an RSRP reporting threshold; and if the adjacent-frequency signal quality reporting amount is RSRQ, the reporting threshold is an RSRQ reporting threshold.

The radio network node may be a base station; for example, the base station may be abase station (BTS, Base Transceiver Station) in a GSM network or a CDMA network, may also be a base station (NodeB) in a WCDMA network, and may further be an evolved base station (eNB or e-NodeB, evolutional Node B) in an LTE network; or a base station controller, for example, a base station controller (BSC, base station controller) in the GSM network or the CDMA network, may also be a radio network controller (RNC, Radio Network Controller) in the WCDMA network, which is not limited in the present application.

Specifically, the radio network node may, through a system broadcast message or a dedicated RRC message, send the adjacent frequency information, the adjacent-frequency signal quality reporting amount, and the corresponding reporting threshold to the terminal.

302: The terminal, according to the adjacent frequency information, performs measurement to obtain an adjacent-frequency signal quality measurement result.

303: Report the adjacent-frequency signal quality measurement result to the radio network node by using a preset bit string.

When the preset bit string is used to report the adjacent-frequency signal quality measurement result, the adjacent-frequency signal quality reporting amount, and the reporting threshold need to be used as a reference for setting a bit value. Specifically, each adjacent frequency received from the radio network node corresponds to a bit in the preset bit string; when the bit value is 1, it indicates that: there is a cell with the signal quality higher than the reporting threshold on the corresponding frequency; and when the bit value is 0, it indicates that: there is no cell with the signal quality higher than the reporting threshold on the corresponding frequency or there is no corresponding frequency for the bit.

For an existing SIB19 (system information broadcast 19, system broadcast information 19) format, a maximum of 8 frequencies may be contained in the SIB19 for sending.

Therefore, the preset bit string may be an 8-bit bit string, and each frequency corresponds to a bit.

The following example further explains step 301 to step 303. The reported frequency information sent by the radio network node contains 5 frequencies, namely, P1, P2, P3, P4, and P5, respectively; the adjacent-frequency signal quality reporting amount is RSRQ; and the RSRQ reporting threshold is X. The adjacent-frequency signal quality measurement results for 5 frequencies P1, P2, P3, P4, and P5 measured by the terminal are X1, X2, X3, X4, and X5, respectively. The bit string selected by the terminal contains at least 5 bits corresponding to the adjacent-frequency signal quality measurement results for the 5 frequencies P1, P2, P3, P4, and P5. This assumes that the selected bit string contains 8 bits. If X1>X, X2>X, X3<X, X4<X, and X5>X, the obtained bit string 11001 indicates the adjacent-frequency signal quality measurement result, and the bit string from left to right corresponds to the frequencies P1, P2, P3, P4, and P5 in sequence. The remaining three bits are all set to 0, indicating that there is no frequency corresponding to the three bits; in this situation, the entire 8-bit bit string is 11001000. Then, the terminal reports 11001000 to the radio network node.

It should be noted that the terminal may, through the preset bit string in an RRC connection request (RRC connection request), a cell update (cell update) message, an initial direct transfer (initial direct transfer) message, an uplink initial direct transfer (uplink direct transfer) message, or a measurement report, send the adjacent-frequency signal quality measurement result to the radio network node. For example, when the RRC connection request, the cell update message, the initial direct transfer message, the uplink initial direct transfer message, or the measurement report is ready to be sent, whether the current adjacent-frequency signal quality measurement result of the terminal is valid is first detected; where the valid may refer to whether the adjacent-frequency signal quality measurement result is out of date; different types of terminals may have different requirements for a valid storage period for the adjacent-frequency signal quality information; and if the adjacent-frequency signal quality information is not out of date, it is considered valid and may be used. In this situation, the preset bit string may be used to report the current adjacent-frequency signal quality measurement result to the radio network node. The current adjacent-frequency signal quality information that has become invalid is not reported. Another manner is as follows: when whether the current adjacent-frequency signal quality measurement result is valid is detected, whether there is a cell with the signal quality higher than the reporting threshold is further detected; if there is the cell with the signal quality higher than the reporting threshold, the preset bit string is used for reporting; and if there is no cell with the signal quality higher than the reporting threshold, the bit string is an all-0 bit string; and the current adjacent-frequency signal quality measurement result indicated by the all-0 bit string has no reference meaning for the radio network node to control cell change for the terminal. Consequently, reporting may not be performed.

304: The radio network node obtains the adjacent-frequency signal quality from the received adjacent-frequency signal quality measurement result, and according to the adjacent-frequency signal quality, makes a decision for the terminal to change to a cell.

Specifically, according to the descriptions of the steps, the adjacent-frequency signal quality measurement result received by the radio network node is an 8-bit bit string 11001000, it is known that the adjacent-frequency signal quality measurement results of the P1, P2, and P5 exceed the reporting threshold. The radio network node may make, according to the adjacent-frequency signal quality, a decision for the terminal to change to a cell.

For example, the radio network node, based on the network load status, or the terminal service type, or the signal quality of a serving cell for the terminal, makes a decision on whether to change to a cell for the terminal; for example, the UE is considered to be transferred to another cell that is more appropriate for the UE; in this situation, the radio network node, referring to the adjacent-frequency signal quality measurement result reported by the terminal, by means of handover, redirection or cell change, transfers by priority the terminal to an adjacent frequency whose bit value is 1.

To further optimize the adjacent-frequency measurement result reported by the terminal, the network side may preset a plurality of bit strings with different lengths; when the terminal reports the adjacent-frequency signal quality measurement result, according to the number of adjacent frequencies delivered by the network side or the number of reporting frequencies specified by the network side, the terminal selects a bit string with an appropriate length to report.

Further, if the adjacent frequency information sent by the radio network node contains few frequencies, for example, the frequencies contained in the adjacent frequency information are frequencies P1 and P2, the terminal uses two bits to respectively indicate the adjacent-frequency signal quality measurement results for the two frequencies P1 and P2, and reports the result to the radio network node; if the frequencies contained in the adjacent frequency information sent by the radio network node are P1, P2, P3, and P4, the terminal may use 8 bits to respectively indicate the adjacent-frequency signal quality measurement results for the frequencies P1, P2, P3, and P4, where 4 bits have no corresponding adjacent-frequency signal quality measurement results and are set to 0. Using 2 bits and 8 bits is only one of optional manners, and actual applications are not limited to this. For example, when the number of specified frequencies is 4, 4 bits may be used to report the adjacent-frequency signal quality measurement result; and when the number of specified frequencies exceeds 8, a bit string with more than 8 bits may be used to report.

In addition, it should be noted that, if the radio network node, delivers a system broadcast message only with frequencies used for the terminal during a cell reselection, and does not explicitly specify the frequencies for reporting the measurement result in the system broadcast message or a dedicated RRC message, the delivered frequencies used for the terminal during the cell reselection in the system broadcast message are considered as the frequencies for which the measurement results need to be reported by the terminal; if the radio network node, in addition to deliver the frequencies used for the terminal during the cell reselection in the system broadcast message, explicitly specifies the frequencies for reporting the measurement result in the system broadcast message or the dedicated RRC message, in this situation, the terminal determines the explicitly specified frequencies as the frequencies for which the measurement results need to be reported. For example, if the radio network node delivers P1, P2, and P3 in the system broadcast message, and then does not explicitly specify the frequencies for reporting the measurement result, P1, P2, and P3 are considered as the frequencies for which the measurement results need to be reported by the terminal; and if the radio network node delivers P1, P2, and P3 in the system broadcast message and also explicitly specifies P1 in the system broadcast message or the dedicated RRC message, the terminal only determines P1 as the frequency for which the measurement result needs to be reported by the terminal.

The radio network node described in the embodiment of the present application, includes a radio network controller, an evolved base station, or a base station controller, and other nodes with a radio resource management function.

The adjacent frequencies described in the embodiment of the present application include frequencies of a neighboring cell in an LTE system, frequencies of a neighboring cell in a GSM system/GPRS system or frequencies of a neighboring cell in a wireless local area network (Wireless Local Area Networks, WLAN).

The method for reporting a signal quality measurement result provided by the embodiment of the present application, by receiving adjacent frequency information, an adjacent-frequency signal quality reporting amount, and a reporting threshold from the radio network node, obtaining an adjacent-frequency signal quality measurement result, and reporting the adjacent-frequency signal quality measurement result to the radio network node by using a preset bit string, the radio network node is capable of making, according to the adjacent-frequency signal quality measurement result, a decision for the terminal to change to a cell, thereby increasing the success rate of cell handover, redirection, and cell change.

Figure 4:
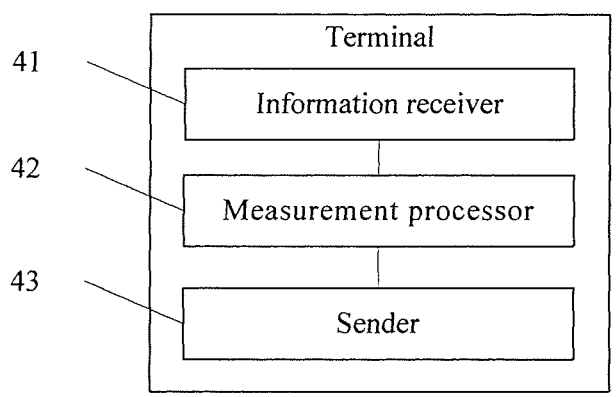
FIG. 4 is a block diagram of a terminal according to another embodiment of the present application.

Another embodiment of the present application provides a terminal, as shown in FIG. 4, where the terminal includes: an information receiver 41, a measurement processor 42, and a sender 43.

The information receiver 41 is configured to receive adjacent frequency information, an adjacent-frequency signal quality reporting amount, and a reporting threshold corresponding to the adjacent-frequency signal quality reporting amount from a radio network node.

Specifically, in an LTE system, the adjacent-frequency signal quality reporting amount includes an RSRP reference receiving signal power or an RSRQ reference receiving signal quality, the reporting threshold includes an RSRP reporting threshold or an RSRQ reporting threshold.

The measurement processor 42 is configured to perform measurement to obtain an adjacent-frequency signal quality measurement result according to the adjacent frequency information.

The sender 43 is configured to report the adjacent-frequency signal quality measurement result in a preset bit string format to the radio network node according to the adjacent frequency information, the adjacent-frequency signal quality reporting amount, and the reporting threshold, so that the radio network node obtains the adjacent-frequency signal quality according to the adjacent-frequency signal quality measurement result.

Each adjacent frequency received from the radio network node corresponds to a bit in the preset bit string; when the bit value is 1, it indicates that: there is a cell with the signal quality higher than the reporting threshold on the corresponding frequency; and when the bit value is 0, it indicates that: there is no cell with the signal quality higher than the reporting threshold on the corresponding frequency or there is no corresponding frequency for the bit.

The sender 43 is specifically configured to report, when an RRC radio resource control protocol connection request, a cell update message, an initial direct transfer message, an uplink initial direct transfer message, or a measurement report message needs to be sent, the current adjacent-frequency signal quality measurement result to the radio network node by using the preset bit string; the sender 43 is further configured to report, when the RRC radio resource control protocol connection request, the cell update message, the initial direct transfer message, the uplink initial direct transfer message, or the measurement report message needs to be sent, and if the current adjacent-frequency signal quality measurement result contains a cell with the signal quality higher than the reporting threshold, the current adjacent-frequency signal quality measurement result to the radio network node by using the preset bit string.

The adjacent frequencies include frequencies of a neighboring cell in an LTE system, frequencies of a neighboring cell in a GSM system/GPRS system or frequencies of a neighboring cell in a wireless local area network.

For the specific functions of the terminal and the functional units of the terminal, reference may be made to the descriptions of the foregoing method embodiments, and details are not described herein again.

Figure 5:
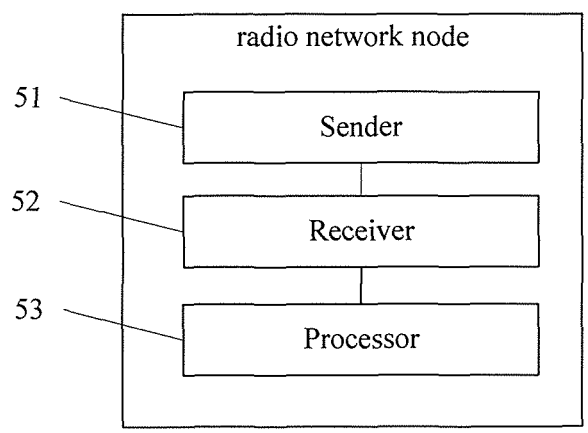
FIG. 5 is a block diagram of a radio network node according to another embodiment of the present application.

In addition, an embodiment of the present application further provides a radio network node; where, the radio network node may be a base station; for example, the base station may be a base station (BTS, Base Transceiver Station) in a GSM network or a CDMA network, may also be a base station (NodeB) in a WCDMA network, and may further be an evolved base station (eNB or e-NodeB, evolutional Node B) in an LTE network; or a base station controller, for example, abase station controller (BSC, base station controller) in the GSM network or the CDMA network, may also be a radio network controller (RNC, Radio Network Controller) in the WCDMA network, which is not limited in the present application. As shown in FIG. 5, the radio network node includes a sender 51, a receiver 52, and a processor 53.

The sender 51 is configured to send adjacent frequency information, an adjacent-frequency signal quality reporting amount, and a reporting threshold corresponding to the adjacent-frequency signal quality reporting amount to a terminal.

Specifically, in an LTE system, the adjacent-frequency signal quality reporting amount includes an RSRP reference receiving signal power or an RSRQ reference receiving signal quality, the reporting threshold includes an RSRP reporting threshold or an RSRQ reporting threshold.

The receiver 52 is configured to receive an adjacent-frequency signal quality measurement result reported in a preset bit string format by the terminal.

The processor 53 is configured to obtain the adjacent-frequency signal quality according to the adjacent-frequency signal quality measurement result.

Each adjacent frequency received from the radio network node corresponds to a bit in the preset bit string; when the bit value is 1, it indicates that: there is a cell with the signal quality higher than the reporting threshold on the corresponding frequency; and when the bit value is 0, it indicates that: there is no cell with the signal quality higher than the reporting threshold on the corresponding frequency or there is no corresponding frequency for the bit.

Figure 6:
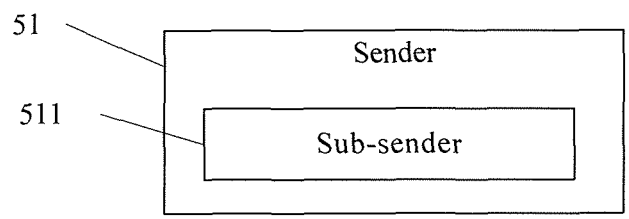
FIG. 6 is a block diagram of a sender according to another embodiment of the present application.

In addition, as shown in FIG. 6, the sender 51 specifically includes a sub-sender 511, which is configured to send, through a system broadcast message or a dedicated RRC radio resource control protocol message, the adjacent frequency information, the adjacent-frequency signal quality reporting amount, and the reporting threshold to the terminal.

For the specific functions of the radio network node and the functional units of the radio network node, reference may be made to the descriptions of the foregoing method embodiments, and details are not described herein again.

Figure 7:
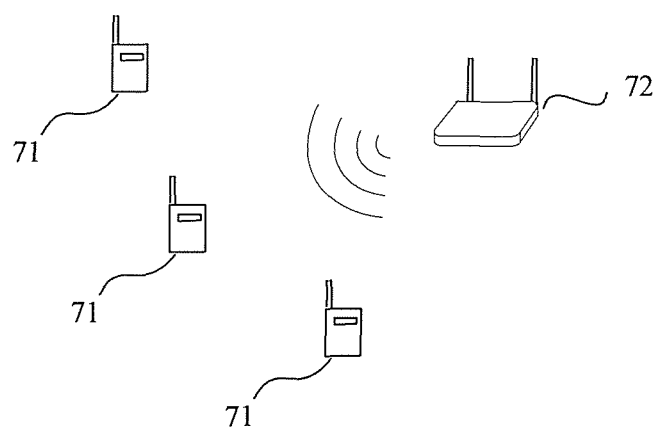
FIG. 7 is a schematic diagram of a system for reporting a signal quality measurement result according to another embodiment of the present application.

An embodiment of the present application further provides a system for reporting a signal quality measurement result, as shown in FIG. 7, the system includes a terminal 71 and/or a radio network node 72.

The terminal 71 is configured to receive adjacent frequency information, an adjacent-frequency signal quality reporting amount, and a reporting threshold corresponding to the adjacent-frequency signal quality reporting amount from a radio network node 72; according to the adjacent frequency information, perform measurement to obtain an adjacent-frequency signal quality measurement result; and report the adjacent-frequency signal quality measurement result in a preset bit string format to the radio network node 72 according to the adjacent frequency information, the adjacent-frequency signal quality reporting amount, and the reporting threshold, so that the radio network node 72 obtains the adjacent-frequency signal quality according to the adjacent-frequency signal quality measurement result.

The radio network node 72 is configured to send the adjacent frequency information, the adjacent-frequency signal quality reporting amount, and the reporting threshold corresponding to the adjacent-frequency signal quality reporting amount to the terminal 71, receive the adjacent-frequency signal quality measurement result reported in the preset bit string format by the terminal 71, and obtain the adjacent-frequency signal quality according to the adjacent-frequency signal quality measurement result.

The terminal, the radio network node, and the system for reporting a signal quality measurement result provided by the embodiments of the present application, by receiving adjacent frequency information, an adjacent-frequency signal quality reporting amount, and a reporting threshold delivered by the radio network node, obtaining an adjacent-frequency signal quality measurement result, and reporting the adjacent-frequency signal quality measurement result to the radio network node by using a preset bit string, the radio network node is capable of making, according to the adjacent-frequency signal quality measurement result, a decision for the terminal to change to a cell, thereby increasing the success rate of cell handover, redirection, and cell change.

It can be clearly understood by a person skilled in the art that, for the purpose of convenient and brief description, division of the foregoing function modules is taken as an example for illustration, in actual implementation, the foregoing functions can be allocated to different modules and implemented according to the need, that is, inner structure of the apparatus is divided into different function modules to implement all or part of the functions described above. For a detailed working process of the foregoing system, apparatus and unit, reference may be made to the corresponding process in the method embodiments, and details are not described herein again.

In the several embodiments provided in the present application, it should be understood that the disclosed system, apparatus, and method may be implemented in other manners. For example, the described apparatus embodiment is merely exemplary; for example, the division of a module or a unit is merely logical function division and may be other division in actual implementation; for example, a plurality of units or components may be combined or integrated into another system, or some features may be ignored or not performed. In addition, the displayed or discussed mutual couplings or direct couplings or communication connections may be implemented through some interfaces; and the indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present application may be integrated into a processor, or each of the units may exist alone physically, or two or more units are integrated into a unit. The integrated unit may be implemented in a form of hardware, or may be implemented in a form of a software functional unit.

When the integrated units are implemented in the form of a software functional unit and sold or used as an independent product, the integrated units may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor (processor) to perform all or a part of steps of the methods described in the embodiments of the present application. The storage medium includes any medium that can store program code, such as a USB flash drive, a removable hard disk, a read-only memory (ROM, Read-Only Memory), a random access memory (RAM, Random Access Memory), a magnetic disk, or an optical disk.

It should be noted that the foregoing embodiments are merely intended for describing the technical solutions of the present application other than limiting the present application. Although the present application is described in detail with reference to the foregoing embodiments, a person of ordinary skill in the art should understand that they may still make modifications to the technical solutions described in the embodiments, or make equivalent replacements to some technical features in the technical solutions thereof, without departing from the spirit and scope of the technical solutions of the embodiments of the present application.

What is claimed is:

1. A method for reporting a signal quality measurement report, the method comprising:

receiving, adjacent frequency information, an adjacent-frequency signal quality reporting amount, and a reporting threshold corresponding to the adjacent-frequency signal quality reporting amount from a radio network node, wherein the adjacent-frequency signal quality reporting amount includes a reference receiving signal power (RSRP) or a reference receiving signal quality (RSRQ);

according to the adjacent frequency information, performing measurement to obtain an adjacent-frequency signal quality measurement result; and reporting the adjacent-frequency signal quality measurement result in a preset bit string format to the radio network node according to the adjacent frequency information, the adjacent-frequency signal quality reporting amount, and the reporting threshold;

wherein each adjacent frequency received from the radio network node corresponds to a bit in the preset bit string; when the value of the bit is a first value, it indicates that: there is a cell with the signal quality higher than the reporting threshold on the corresponding frequency for the bit; and when the value of the bit is a second value, it indicates that: there is no cell with the signal quality higher than the reporting threshold on the corresponding frequency for the bit or there is no corresponding frequency for the bit.

2. The method according to claim 1, wherein reporting the adjacent-frequency signal quality measurement result in a preset bit string to the radio network node comprises:
reporting, when a radio resource control (RRC) protocol connection request, a cell update message, an initial direct transfer message, an uplink initial direct transfer message, or a measurement report message needs to be sent, the current adjacent-frequency signal quality measurement result to the radio network node by using the preset bit string; or
reporting, when the RRC protocol connection request, the cell update message, the initial direct transfer message, the uplink initial direct transfer message, or the measurement report message needs to be sent, and if the current adjacent-frequency signal quality measurement result indicates that there is a cell with the signal quality higher than the reporting threshold, the current adjacent-frequency signal quality measurement result to the radio network node by using the preset bit string.

3. A method for reporting a signal quality measurement report, the method comprising:
sending, adjacent frequency information, an adjacent-frequency signal quality reporting amount, and a reporting threshold corresponding to the adjacent-frequency signal quality reporting amount to a terminal, wherein the adjacent-frequency signal quality reporting amount includes a reference receiving signal power (RSRP) or a reference receiving signal quality (RSRQ); and
receiving, an adjacent-frequency signal quality measurement result reported in a preset bit string format by the terminal;
wherein each adjacent frequency sent to the terminal corresponds to a bit in the preset bit string; when the value of the bit is a first value, it indicates that: there is a cell with the signal quality higher than the reporting threshold on the corresponding frequency for the bit; and when the value of the bit is a second value, it indicates that: there is no cell with the signal quality higher than the reporting threshold on the corresponding frequency for the bit or there is no corresponding frequency for the bit.

4. The method according to claim 3, wherein sending adjacent frequency information, an adjacent-frequency signal quality reporting amount, and a reporting threshold corresponding to the adjacent-frequency signal quality reporting amount to a terminal comprises:
sending, through a system broadcast message or a dedicated radio resource control (RRC) protocol message, the adjacent frequency information, the adjacent-frequency signal quality reporting amount, and the reporting threshold to the terminal.

5. A terminal, comprising:
an information receiver, configured to receive adjacent frequency information, an adjacent-frequency signal quality reporting amount, and a reporting threshold corresponding to the adjacent-frequency signal quality reporting amount from a radio network node, wherein the adjacent-frequency signal quality reporting amount includes a reference receiving signal power (RSRP) or a reference receiving signal quality (RSRQ);

a measurement processor, configured to perform measurement to obtain an adjacent-frequency signal quality measurement result according to the adjacent frequency information; and
a sender, configured to report the adjacent-frequency signal quality measurement result in a preset bit string format to the radio network node according to the adjacent frequency information, the adjacent-frequency signal quality reporting amount, and the reporting threshold;
wherein each adjacent frequency received from the radio network node corresponds to a bit in the preset bit string; when the value of the bit is a first value, it indicates that: there is a cell with the signal quality higher than the reporting threshold on the corresponding frequency for the bit; and when the value of the bit is a second value, it indicates that: there is no cell with the signal quality higher than the reporting threshold on the corresponding frequency for the bit or there is no corresponding frequency for the bit.

6. The terminal according to claim 5, wherein the sender is configured to:
report, when a radio resource control (RRC) protocol connection request, a cell update message, an initial direct transfer message, an uplink initial direct transfer message, or a measurement report message needs to be sent, the current adjacent-frequency signal quality measurement result to the radio network node by using the preset bit string; or
report, when the RRC radio resource control protocol connection request, the cell update message, the initial direct transfer message, the uplink initial direct transfer message, or the measurement report message needs to be sent, and if the current adjacent-frequency signal quality measurement result indicates that there is a cell with the signal quality higher than the reporting threshold, the current adjacent-frequency signal quality measurement result to the radio network node by using the preset bit string.

7. A radio network node, comprising:
a sender, configured to send adjacent frequency information, an adjacent-frequency signal quality reporting amount, and a reporting threshold corresponding to the adjacent-frequency signal quality reporting amount to a terminal, wherein the adjacent-frequency signal quality reporting amount includes a reference receiving signal power (RSRP) or a reference receiving signal quality (RSRQ); and
a receiver, configured to receive an adjacent-frequency signal quality measurement result reported in a preset bit string format by the terminal;
wherein each adjacent frequency sent by the radio network node corresponds to a bit in the preset bit string; when the value of the bit is a first value, it indicates that: there is a cell with the signal quality higher than the reporting threshold on the corresponding frequency for the bit; and when the value of the bit is a second value, it indicates that: there is no cell with the signal quality higher than the reporting threshold on the corresponding frequency for the bit or there is no corresponding frequency for the bit.

8. The radio network node according to claim 7, wherein the sender comprises:
a sub-sender, configured to send, through a system broadcast message or a dedicated RRC radio resource control protocol message, the adjacent frequency information, the adjacent-frequency signal quality reporting amount, and the reporting threshold to the terminal.

* * * * *